(12) United States Patent
Zhou et al.

(10) Patent No.: US 9,405,649 B2
(45) Date of Patent: Aug. 2, 2016

(54) DEBUGGING CIRCUIT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wu Zhou, Shenzhen (CN); Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 197 days.

(21) Appl. No.: 14/331,384

(22) Filed: Jul. 15, 2014

(65) Prior Publication Data

US 2015/0026520 A1    Jan. 22, 2015

(30) Foreign Application Priority Data

Jul. 16, 2013 (CN) .......................... 2013 1 0296286

(51) Int. Cl.
*G06F 11/00* (2006.01)
*G06F 11/273* (2006.01)
*G06F 11/22* (2006.01)

(52) U.S. Cl.
CPC .......... *G06F 11/273* (2013.01); *G06F 11/2284* (2013.01)

(58) Field of Classification Search
CPC ............ G06F 11/273–11/2736; G06F 11/2284
See application file for complete search history.

(56) References Cited

U.S. PATENT DOCUMENTS

| | | | |
|---|---|---|---|
| 8,966,313 B2* | 2/2015 | Truong ............... | G06F 11/3656 714/30 |
| 9,015,542 B2* | 4/2015 | Jones ............. | G01R 31/318547 714/726 |
| 2013/0162324 A1* | 6/2013 | Li .................. | G01R 31/318572 327/405 |
| 2015/0067424 A1* | 3/2015 | Waltermann ... | G01R 31/318536 714/726 |

* cited by examiner

*Primary Examiner* — Michael Maskulinski
(74) *Attorney, Agent, or Firm* — ScienBiziP, P.C.

(57) ABSTRACT

A debugging circuit comprises a debugging interface, a switch unit coupled to the debugging interface, a controller coupled to the switch unit, a platform controller hub (PCH), and a central processing unit (CPU). The PCH and the CPU are coupled to the switch unit. The debugging interface is coupled between the switch unit and a debugging device. The switch unit receives a control signal from the controller, and selectively outputs a first data signal from the PCH or a second data signal from the CPU to the debugging device through the debugging interface according to the control signal.

5 Claims, 2 Drawing Sheets

DEBUGGING CIRCUIT

FIELD

The present disclosure relates to debugging circuits.

BACKGROUND

A platform controller hub (PCH) and a central processing unit (CPU) can be debugged through a basic input output system (BIOS) on a motherboard.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
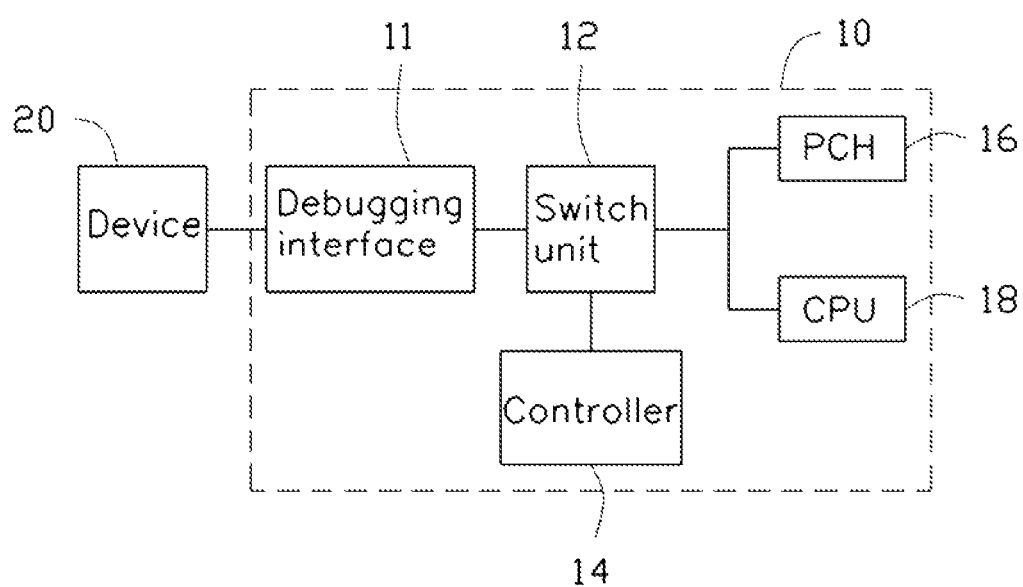
FIG. 1 is a block diagram of an example embodiment of a debugging circuit coupled to a device to be debugged.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The present disclosure is described in relation to a debugging circuit on a motherboard.

FIG. 1 illustrates an example embodiment of a debugging circuit 10 on a motherboard coupled to a device 20 to be debugged. The debugging circuit 10 comprises a debugging interface 11, a switch unit 12 coupled to the debugging interface 11, a platform controller hub (PCH) 16 coupled to the switch unit 12, and a central processing unit (CPU) 18 coupled to the switch unit 12.

Figure 2:
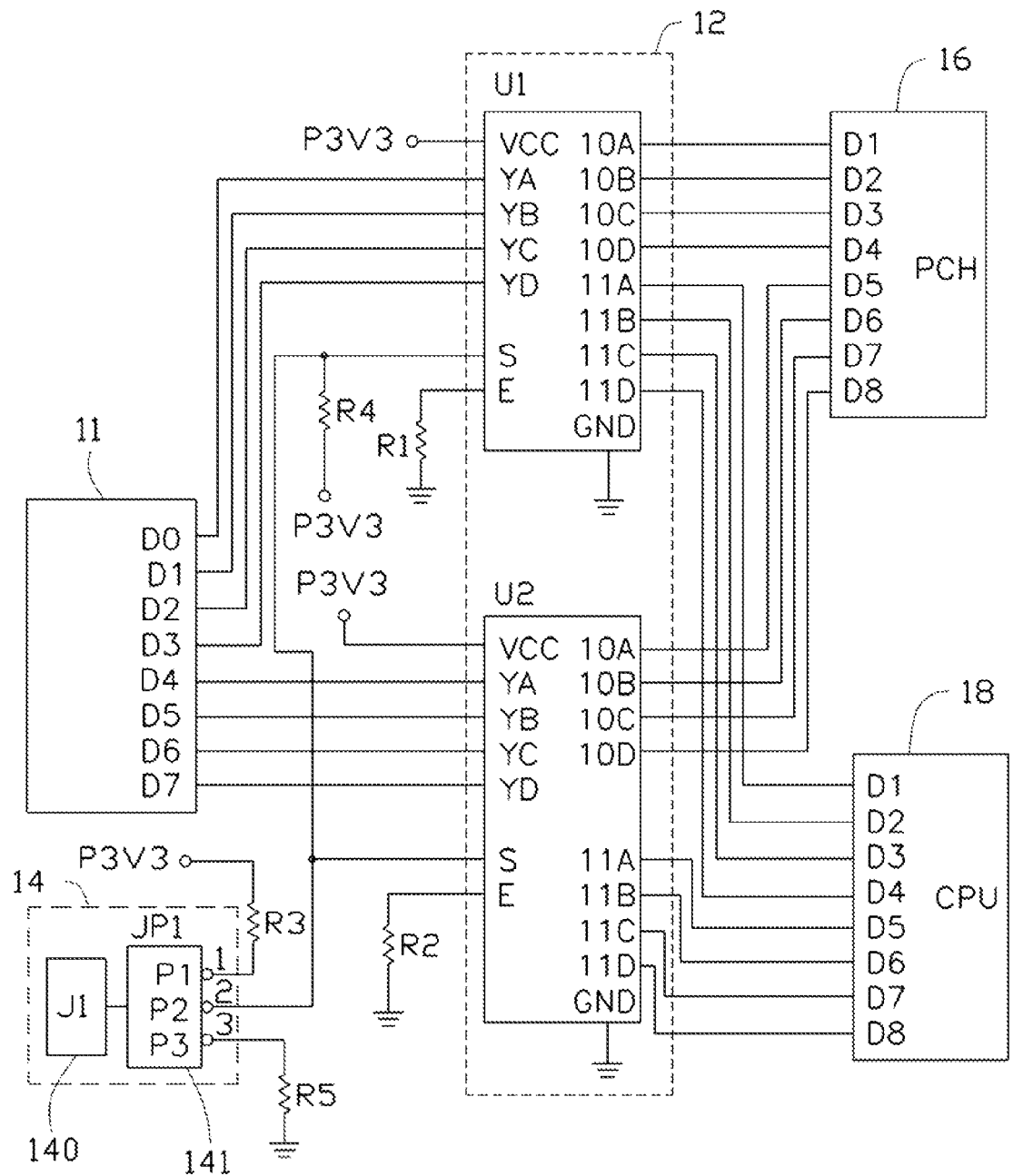
FIG. 2 is an example circuit diagram of the debugging circuit of FIG. 1.

FIG. 2 shows an example embodiment of the debugging circuit 10. The switch unit 12 comprises a first switch chip U1 and a second switch chip U2. Each of the first switch chip U1 and the second switch chip U2 comprises a ground pin GND, an enable pin E, a logic control pin S, a power pin VCC, first, second, third, and fourth input terminals 10A, 10B, 10C, 10D, fifth, sixth, seventh, and eighth input terminals 11A, 11B, 11C, 11D, and first, second, third, and fourth output terminals YA-YD. The PCH 16 comprises a first group of data pins D1-D4 and a second group of data pins D5-D8. The first group of data pins D1-D4 is coupled in a respective fashion to the first, second, third, and fourth input terminals 10A, 10B, 10C, 10D of the first switch chip U1. The second group of data pins D5-D8 is coupled in the same fashion to the first, second, third, and fourth input terminals 10A, 10B, 10C, 10D of the second switch chip U2. The CPU 18 comprises a first group of data pins D1-D4 and a second group of data pins D5-D8. The first group of data pins D1-D4 of the CPU 18 is coupled in a respective fashion to the fifth, sixth, seventh, and eighth input terminals 11A, 11B, 11C, 11D of the first switch chip U1. The second group of data pins D5-D8 of the CPU 18 is coupled in the same fashion to the fifth, sixth, seventh, and eighth input terminals 11A, 11B, 11C, 11D of the second switch chip U2. The ground pins GND of the first and second switch chips U1, U2 are grounded. The enable pins E of the first and second switch chips U1, U2 are respectively grounded through resistors R1 and R2. The logic control pins S of the first and second switch chips U1, U2 are coupled to the controller 14. The power pins VCC of the first and second switch chips U1, U2 are coupled to a power source P3V3.

The debugging interface 11 comprises first to eighth input terminals D0-D7. The four output terminals YA-YD of the first switch chip U1 are respectively coupled to the four input terminals D0-D3 of the debugging interface 11. The four output terminals YA-YD of the second switch chip U2 are respectively coupled to the four input terminals D4-D7 of the debugging interface 11.

The controller 14 comprises a jumper 140 and a connector 141. A first pin P1 of the connector 141 is coupled to the power source P3V3 through a resistor R3. A second pin P2 of the connector 141 is coupled to the logic control pins S of the first and second switch chips U1, U2. The second pin P2 of the connector 141 is coupled to the power source P3V3 through a resistor R4. A third pin P3 of the connector 141 is grounded through a resistor R5.

In use, when the PCH 16 is debugged, the first and second pins P1, P2 of the connector 141 are coupled by the jumper 140. The second pin P2 of the connector 141 outputs a digital high signal, such as logic "1" to the logic control pins S of the first and second switch chips U1, U2. A first data signal from the data pins D1-D8 of the PCH 16 is transmitted to the first, second, third, and fourth input terminals 10A, 10B, 10C, 10D of the first and second switch chips U1, U2. The output terminals YA-YD of the first switch chip U1 are coupled to the first, second, third, and fourth input terminals 10A, 10B, 10C, 10D of the first switch chip U1, and not coupled to the fifth, sixth, seventh, and eighth input terminals 11A, 11B, 11C, 11D of the first switch chip U1. The output terminals YA-YD of the second switch chip U2 are coupled to the first, second, third, and fourth input terminals 10A, 10B, 10C, 10D of the second switch chip U2, and not coupled to the fifth, sixth, seventh, and eighth input terminals 11A, 11B, 11C, 11D of the first switch chip U1. The output terminals YA-YD of the first and second switch chip U1, U2 transmits the first data signal from the PCH 16 to the device 20 to be debugged through the debugging interface 11.

When the CPU 18 is debugged, the second and third pins P2, P3 of the connector 141 are coupled by the jumper 140. The second pin P2 of the connector 141 outputs a digital low signal, such as logic "0" to the logic control pins S of the first and second switch chips U1, U2. A second data signal from the data pins D1-D8 of the CPU 18 is transmitted to the first, second, third, and fourth input terminals 10A, 10B, 10C, 10D of the first and second switch chips U1, U2. The output terminals YA-YD of the first switch chip U1 are coupled to the first to fifth, sixth, seventh, and eighth input terminals 11A, 11B, 11C, 11D of the first switch chip U1, and not coupled to the fourth input terminals 10A, 10B, 10C, 10D of the first switch chip U1. The output terminals YA-YD of the second switch chip U2 are coupled to the fifth, sixth, seventh, and eighth input terminals 11A, 11B, 11C, 11D of the second switch chip U2, and not coupled to the fourth input terminals 10A, 10B, 10C, 10D of the first switch chip U1. The output terminals YA-YD of the first and second switch chips U1, U2 transmit the second data signal from the CPU 18 to the device 20 to be debugged through the debugging interface 11.

Thus, switch unit 12 transmits the first or second data signal from the PCH 16 or from the CPU 18 to the device 20 through the debugging interface 11 according to the control signal from the controller 14.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A debugging circuit connecting to a device to be debugged, the debugging circuit comprising:
    a platform controller hub comprising a first group of data pins and a second group of data pins;
    a central processing unit comprising a first group of data pins and a second group of data pins;
    a controller outputting a control signal;
    a debugging interface comprising a plurality of input terminals; and
    a switch unit comprising a plurality of logic control pins receiving the control signal from the controller, a first group of input terminals, a second group of input terminals, and a plurality of output terminals coupled to the plurality of input terminals of the debugging interface;
    wherein the first group of input terminals of the switch unit are correspondingly coupled to the first and second groups of data pins of the platform controller hub, for receiving a first data signal from the platform controller hub; the second group of input terminals of the switch unit are correspondingly coupled to the first and second groups of data pins of the central processing unit, for receiving a second data signal from the central processing unit; the output terminals of the switch unit selectively output the first data signal or the second data signal to the device to be debugged through the debugging interface, according to the control signal received by the logic control pins of the switch unit from the controller.

2. The debugging circuit of claim 1, wherein the switch unit further comprises a first switch chip and a second switch chip, each of the first and second switch chips comprises an enable pin, a ground pin, a logic control pin, a power pin, first to eighth input terminals, and first, second, third, and fourth output terminals; the enable pins and the ground pins of the first and second switch chips are grounded, the power pins of the first and second switch chips are coupled to a power source; the first group of input terminals of the switch unit comprises the first, second, third, and fourth input terminals of the first and second switch chips, to connect to the platform controller hub; the second group of input terminals of the switch unit comprises the fifth, sixth, seventh, and eighth input terminals of the first and second switch chip, to connect to the central processing unit; the first, second, third, and fourth output terminals of the first and second switch chip are correspondingly coupled to the plurality of input terminals of the debugging interface; wherein when the controller outputs a digital high signal to the logic control pins of the first and second switch chips, the first and second switch chips transmit the first data signal from the platform controller hub to the device to be debugged through the debugging interface; when the controller outputs a digital low signal to the logic control pins of the first and second switch chips, the first and second switch chips transmit the second data signal from the central processing unit to the device to be debugged through the debugging interface.

3. The debugging circuit of claim 2, wherein the controller comprises a connector and a jumper; a first pin of the connector is coupled to the power source through a first resistor; a second pin of the connector is coupled to the logic control pins of the first and second switch chips, and is coupled to the power source through a second resistor; a third pin of the connector is grounded through a third resistor; when the first and second pins of the connector are coupled by the jumper, the second pin of the connector outputs a digital high signal to the logic control pins of the first and second switch chips; when the second and the third pins of the connector are coupled by the jumper, the second pin of the connector outputs a digital low signal to the logic control pins of the first and second switch chips.

4. The debugging circuit of claim 2, wherein the enable pins of the first and second switch chips are grounded through fourth and fifth resistors, respectively.

5. A debugging circuit comprising:
    a processor;
    a platform controller hub;
    a controller; and
    a switching unit;
    a first group of input terminals of the switching unit electronically coupled to one or more groups of data pins of the platform controller hub;
    a second group of input terminals of the switch unit electronically coupled to one or more groups of data pins of the processor;
    the controller, configured to selectively determine a signal to be outputted from a plurality of output terminals of the switching unit, wherein the selection is of the one or more groups of the platform controller hub or the processor.

* * * * *